W. W. WILLIAMS.
RESERVE ATTACHMENT FOR FUEL TANKS.
APPLICATION FILED AUG. 6, 1913.
1,102,971.
Patented July 7, 1914.
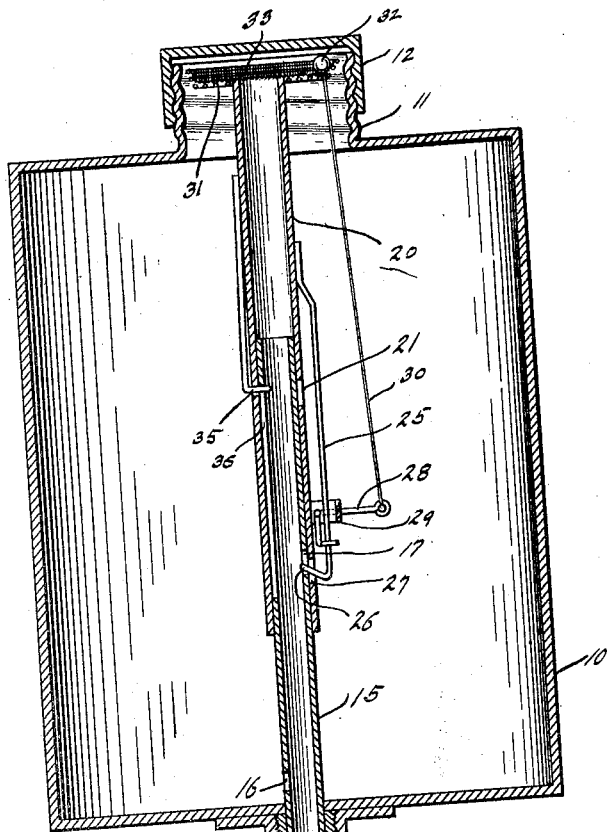
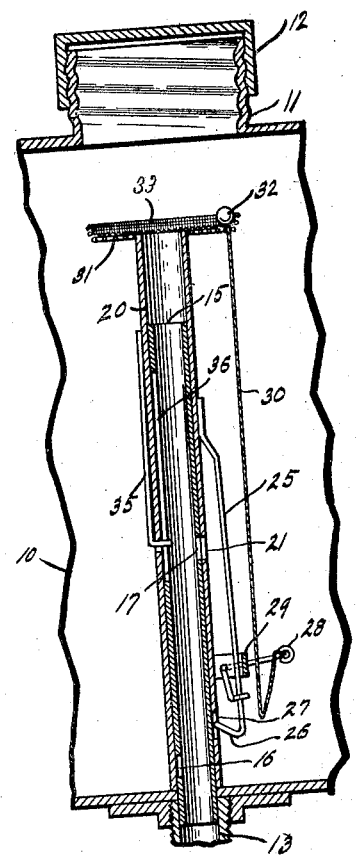
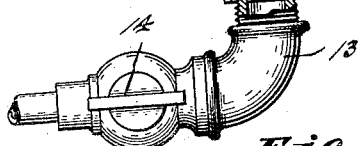
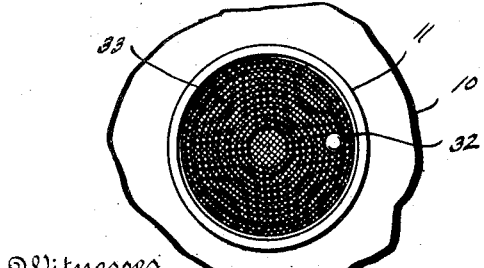
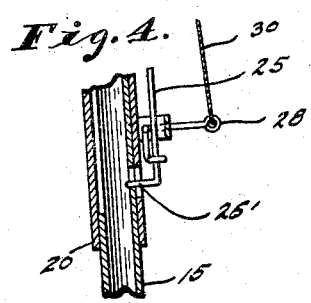
Witnesses
Frank A. Fahle
Josephine Gasper
Inventor
William W. Williams
Arthur M. Hood
Attorney

UNITED STATES PATENT OFFICE.

WILLIAM W. WILLIAMS, OF INDIANAPOLIS, INDIANA, ASSIGNOR OF ONE-HALF TO WILLIAM P. CARPENTER, OF INDIANAPOLIS, INDIANA.

RESERVE ATTACHMENT FOR FUEL-TANKS.

1,102,971.    Specification of Letters Patent.    Patented July 7, 1914.

Application filed August 6, 1913. Serial No. 783,293.

*To all whom it may concern:*

Be it known that I, WILLIAM W. WILLIAMS, a citizen of the United States, residing at Indianapolis, in the county of Marion and State of Indiana, have invented a new and useful Reserve Attachment for Fuel-Tanks, of which the following is a specification.

It frequently happens that the fuel supply of automobiles becomes exhausted at places where more fuel cannot be obtained or is obtainable only with great difficulty. It is the object of my invention to prevent this, at least unless there is gross negligence on the part of the driver. In attaining this object I provide a fuel tank wherein the fuel can normally be drawn from the tank only to a level above the bottom thereof, thus providing a reserve; and means whereby this reserve can be made obtainable, said means when rendering the reserve obtainable being moved to an abnormal position requiring its return to normal position in order to refill the tank. Thus the reserve-controlling means is almost inevitably in position to hold the reserve fuel when the tank is full.

The accompanying drawing illustrates my invention.

Figure 1 is a vertical central section through an automobile tank equipped with my invention, the parts being in position to render the reserve fuel obtainable; Fig. 2 is a fragmentary view somewhat similar to Fig. 1, but showing the parts in position to hold the reserve fuel; Fig. 3 is a partial plan view of the tank with the filling cap removed; and Fig. 4 is a fragmentary view showing a modification.

The fuel tank 10 is provided at the top with a filling neck 11 having a screw cap 12, and at the bottom with a discharge outlet 13 provided with a stop cock 14, said discharge outlet 13 being connected to any suitable device requiring fuel from the tank 10, as for instance the carbureter and engine of an automobile. However, the outlet 13 does not open directly into the bottom of the tank 10, but at its inner end is provided with an upwardly extending tube 15 through which its supply must come. This tube extends upwardly into the tank as far as desired, and is provided with an opening 16 near the bottom of the tank and an opening 17 sufficiently above such bottom so that the amount of fuel contained in the tank below such opening 17 is sufficient for emergency use, as to enable the automobile to be driven for several miles or to a place where more fuel may be secured. Closely fitting around the tube 15 is a second tube 20, which is movable vertically along the tube 15 either to the position shown in Fig. 1 or to the position shown in Fig. 2. When in the latter position, the tube 20 covers the opening 16, but an opening 21 in the tube 20 registers with the opening 17 in the tube 15 so that fuel can be drawn from the tank through the discharge outlet 13 by way of the openings 21 and 17 so long as the level of the fuel within the tank does not fall below the level of the opening 17. However, if the fuel level falls below that point, the supply for the outlet 13 is cut off, although there is still a supply of fuel remaining in the tank. If now the tube 20 is slid upwardly from the position shown in Fig. 2 to the position shown in Fig. 1, the opening 16 is uncovered and the reserve fuel rendered obtainable.

Any suitable means may be provided for retaining the tube 20 in its upper position. In the arrangement shown this retaining means is a spring 25 carried by the tube 20 and having an inturned and upwardly inclined lower end 26, which extends through an opening 27 in the tube 20. When the tube 20 is drawn upwardly, the latch formed by the inturned end 26 springs through the opening 17 and holds the tube 20 against being jarred from its upper position. However, if the tube 20 is pushed downwardly, the inclined lower face of the end 26 causes the latter to be pushed outwardly from the opening 17 by its cam action on the lower edge of said opening. The end 26 may also be withdrawn from the opening 17 by the operation of a bell-crank lever 28 pivoted on a bracket 29 carried by the tube 20, said bell-crank lever having one end coöperating with the spring 25 to push it outward and the other being connected to a cord 30 which extends upward through a frame 31, carried by the upper end of the tube 20, the upper end of the cord having a knob 32 whereby it may be pulled when desired. Ordinarily it is not necessary to pull the cord 30 with the arrangement shown on Fig. 1, but this cord or its equivalent is necessary if instead of having the inturned end 26 of the spring 25 inclined upwardly such end is made square, as is the end 26' in the modification shown in Fig. 4. The upper end of the tube 20 extends into the filling neck 11 when the tube 20 is raised, thereby preventing the insertion of a funnel into such neck for filling the tank. Upon an attempt to insert such a funnel, the lower end of the funnel presses downward on the frame 31 and the tube 20 and forces the tube to its lower position, wherein it closes the opening 16. The frame 31 is made of spiral wire, or otherwise open, so that the fuel supplied through a filling funnel may flow freely through it, instead of being retarded as it would be if the frame 31 were solid and the filling funnel rested directly upon it, and is preferably also in the shape of a cup and lined with wire gauze 33 so that the fuel put into the tank will be strained.

Any suitable means may be provided for guiding the tube 20 in its movements along the tube 15. As shown, this is a finger 35 fixed to the tube 20 and extending through a longitudinal slot 36 in the tube 15. This insures that the opening 21 and the latch 26 will register with the opening 17 when the tube 20 is in its lower and upper positions respectively.

I claim as my invention:

1. In combination, a liquid reservoir having a filling opening and a discharge outlet, a tube from which liquid from the tank is supplied to said discharge outlet, said tube communicating with the interior of the reservoir at two different levels, a tube telescoping with the first tube and movable to cover and uncover the opening at the lower level in the first tube, and means on the second tube for obstructing the filling opening when said second tube uncovers the opening at the lower level in the first tube.

2. In combination, a liquid reservoir having a filling opening and a discharge outlet, and means movable to obstruct or leave free said filling opening and in its movements varying the lowest level to which the discharge outlet may withdraw the liquid in said reservoir, said obstructing means having a concave upper surface and being perforated so that it serves as a strainer.

3. In combination, a liquid reservoir having a filling opening and a discharge outlet, a tube from which liquid from the tank is supplied to said discharge outlet, said tube communicating with the interior of the reservoir at two different levels, a tube telescoping with the first tube and movable to cover and uncover the opening at the lower level in the first tube, and means on the second tube for obstructing the filling opening when said second tube uncovers the opening at the lower level in the first tube, said obstructing means having a concave upper surface and being perforated so that it serves as a strainer.

4. In combination, a liquid reservoir having a filling opening and a discharge outlet, a tube from which liquid from the tank is supplied to said discharge outlet, said tube communicating with the interior of the reservoir at two different levels, a tube telescoping with and slidable freely longitudinally of the first tube and movable to cover and uncover the opening at the lower level in the first tube, and resilient means for preventing accidental displacement of said sliding tube when it is in position to uncover the opening at the lower level in the first tube.

5. In combination, a liquid reservoir having a filling opening and a discharge outlet, a tube from which liquid from the tank is supplied to said discharge outlet, said tube communicating with the interior of the reservoir at two different levels, a tube telescoping with and slidable freely longitudinally of the first tube and movable to cover and uncover the opening at the lower level in the first tube, and resilient means releasable by longitudinal pressure on the sliding tube for preventing accidental displacement of said sliding tube when it is in position to uncover the opening at the lower level in the first tube.

6. In combination, a liquid reservoir having a filling opening and a discharge outlet, and means movable to vary the lowest level to which the discharge outlet may withdraw the liquid in said reservoir, said movable means including a perforated cup which is in position to receive liquid supplied to the reservoir when the movable means is moved to a position to allow the discharge outlet to withdraw fuel from the reservoir to a lower level therein.

7. In combination, a liquid reservoir having a filling opening and a discharge outlet, and means movable to vary the lowest level to which the discharge outlet may withdraw the liquid in said reservoir, said movable means including a cup which is in position to receive liquid supplied to the reservoir when the movable means is moved to a position to allow the discharge outlet to withdraw fuel from the reservoir to a lower level therein.

In witness whereof, I have hereunto set my hand at Indianapolis, Indiana, this 4th day of August, A. D. one thousand nine hundred and thirteen.

WILLIAM W. WILLIAMS.

Witnesses:
FRANK A. FAHLE,
G. B. SCHLEY.

Copies of this patent may be obtained for five cents each, by addressing the "Commissioner of Patents, Washington, D. C."